US008613869B2

(12) United States Patent
Sakata et al.

(10) Patent No.: US 8,613,869 B2
(45) Date of Patent: Dec. 24, 2013

(54) α-TYPE SILICON NITRIDE PHOSPHOR AND PRODUCTION METHOD THEREOF

(75) Inventors: Shin-ichi Sakata, Yamaguchi (JP); Hiroshi Oda, Yamaguchi (JP); Takuma Sakai, Yamaguchi (JP)

(73) Assignee: Ube Industries, Inc. (JP)

( * ) Notice: Subject to any disclaimer, the term of this patent is extended or adjusted under 35 U.S.C. 154(b) by 795 days.

(21) Appl. No.: 12/532,710

(22) PCT Filed: Mar. 4, 2008

(86) PCT No.: PCT/JP2008/054251
§ 371 (c)(1),
(2), (4) Date: Sep. 23, 2009

(87) PCT Pub. No.: WO2008/126540
PCT Pub. Date: Oct. 23, 2008

(65) Prior Publication Data
US 2010/0108946 A1   May 6, 2010

(30) Foreign Application Priority Data

Mar. 23, 2007   (JP) ................. 2007-076250

(51) Int. Cl.
*C09K 11/08*    (2006.01)

(52) U.S. Cl.
USPC .................................. 252/301.4 F

(58) Field of Classification Search
USPC ............. 252/301.4 F, 301.4 R; 313/467, 468
See application file for complete search history.

(56) References Cited

U.S. PATENT DOCUMENTS

| 4,609,633 | A | * | 9/1986 | Fukuhara et al. | ............ | 501/97.2 |
| 5,032,554 | A | * | 7/1991 | Mizuno et al. | ................ | 501/97.2 |
| 7,144,524 | B2 | * | 12/2006 | Sakata et al. | ............ | 252/301.4 F |
| 2003/0020101 | A1 | * | 1/2003 | Bogner et al. | ................ | 257/233 |
| 2003/0030038 | A1 | | 2/2003 | Mitomo et al. | | |
| 2003/0168643 | A1 | | 9/2003 | Mitomo et al. | | |
| 2005/0012075 | A1 | * | 1/2005 | Sakata et al. | ............ | 252/301.4 F |

(Continued)

FOREIGN PATENT DOCUMENTS

| EP | 0 231 130 A2 | 8/1987 |
| EP | 1 104 799 A1 | 6/2001 |

(Continued)

OTHER PUBLICATIONS

Gazza, 'Examining Si3N4 Base Materials With Various Rare Earth Additions', Dec. 1991, US Army Materials Technology Laboratory, pp. 1-4.*

(Continued)

*Primary Examiner* — Emily Le
*Assistant Examiner* — Lynne Edmondson
(74) *Attorney, Agent, or Firm* — DLA Piper LLP (US)

(57) ABSTRACT

A practical novel phosphor material composed of an α-type silicon nitride, i.e., an α-type silicon nitride phosphor containing a fluorescence-emittable element throughout an α-type silicon nitride particle from the surface to the inside, is provided. Portions having a high emittable element concentration are preferably present like islands, and the fluorescence-emittable element is preferably a lanthanide metal. A powder composed of a fluorescence-emittable element is added to silicon diimide ($Si(NH)_2$) or an amorphous silicon nitride powder obtained by thermally decomposing silicon diimide ($Si(NH)_2$), the powders are mixed, and the mixture is fired in a non-oxidizing atmosphere, whereby the phosphor material is obtained.

4 Claims, 9 Drawing Sheets

(56) References Cited

U.S. PATENT DOCUMENTS

| | | |
|---|---|---|
| 2005/0116244 A1 | 6/2005 | Sakata et al. |
| 2006/0066209 A1 | 3/2006 | Chau |
| 2006/0066221 A1 | 3/2006 | Belinski-Wolfe et al. |
| 2006/0261310 A1 | 11/2006 | Belinski-Wolfe et al. |
| 2007/0040502 A1 | 2/2007 | Setlur et al. |

FOREIGN PATENT DOCUMENTS

| | | |
|---|---|---|
| JP | 62-182163 A | 8/1967 |
| JP | 02-230602 A | 9/1990 |
| JP | 07-188654 A | 7/1995 |
| JP | 2002-363554 A | 12/2002 |
| JP | 2005-162808 A | 6/2005 |
| JP | 2006-108090 A | 4/2006 |
| WO | 2005/049763 | 6/2005 |
| WO | 2006/107720 | 10/2006 |

OTHER PUBLICATIONS

Ziegler, 'Atomic-scale observation of the grain-boundary structure of Yb-doped and heat-treated silicon nitride ceramics', Oct. 2, 2007, Applied Physics Letters, 91, pp. 141906-1 to 141906-3.*

Henning A. Höppe et. al., "Hyperfine interaotiona in the 13 K ferromagnet $En_2Si_5N_8$," Journal of Physics and Chemistry of Solids, 2002, vol. 63, No. 5, pp. 853-859.

Y. Q. Li, G. de With et al, "Luminescence Properties of $Ce^3$+-Activated Alkaline Earth Silicon Nitride $M_2Si_5N_8$ (M=Ca, Sr, Ba) Materials" *Journal of Luminescence*, 2006, vol. 116, pp. 107-116.

\* cited by examiner

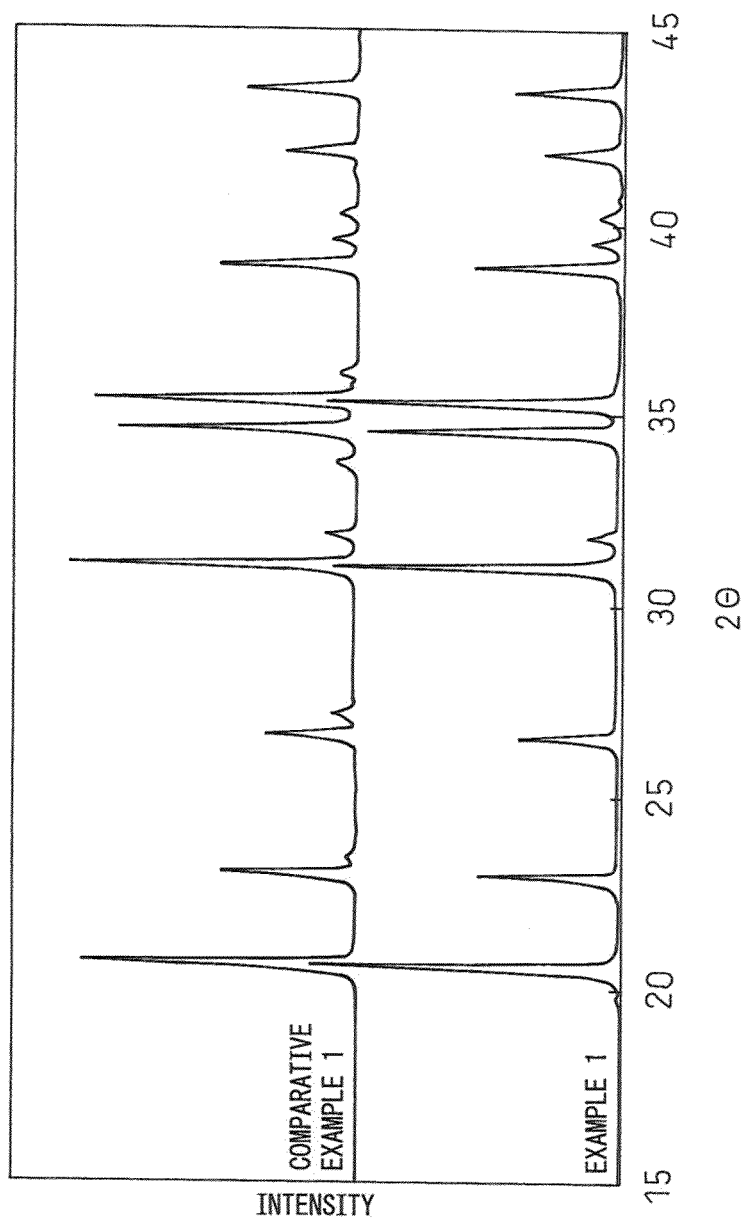

Fig.2A
Fig.2B
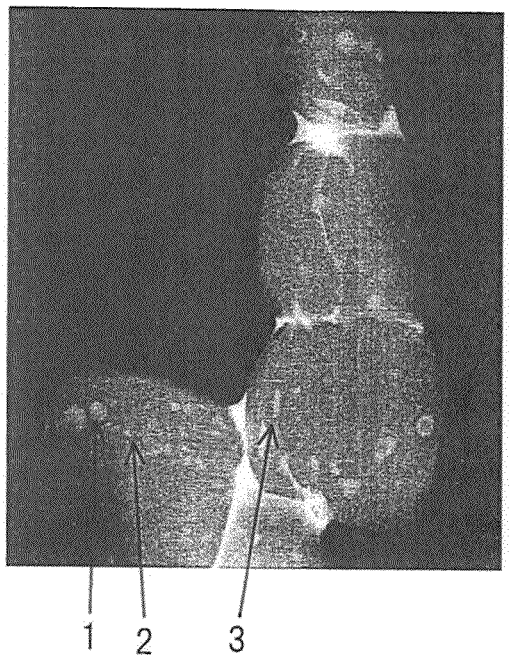
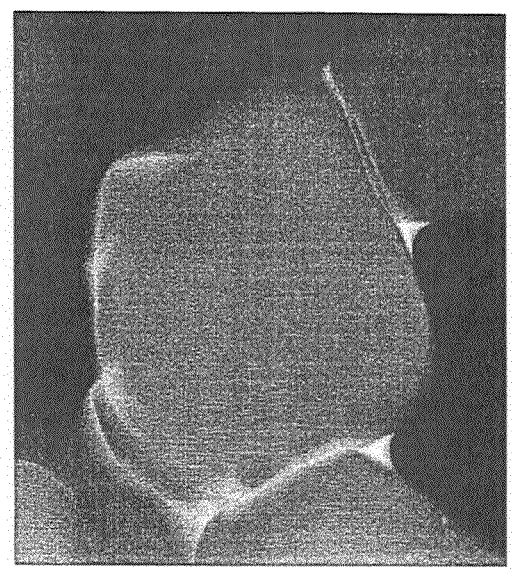
1 2 3

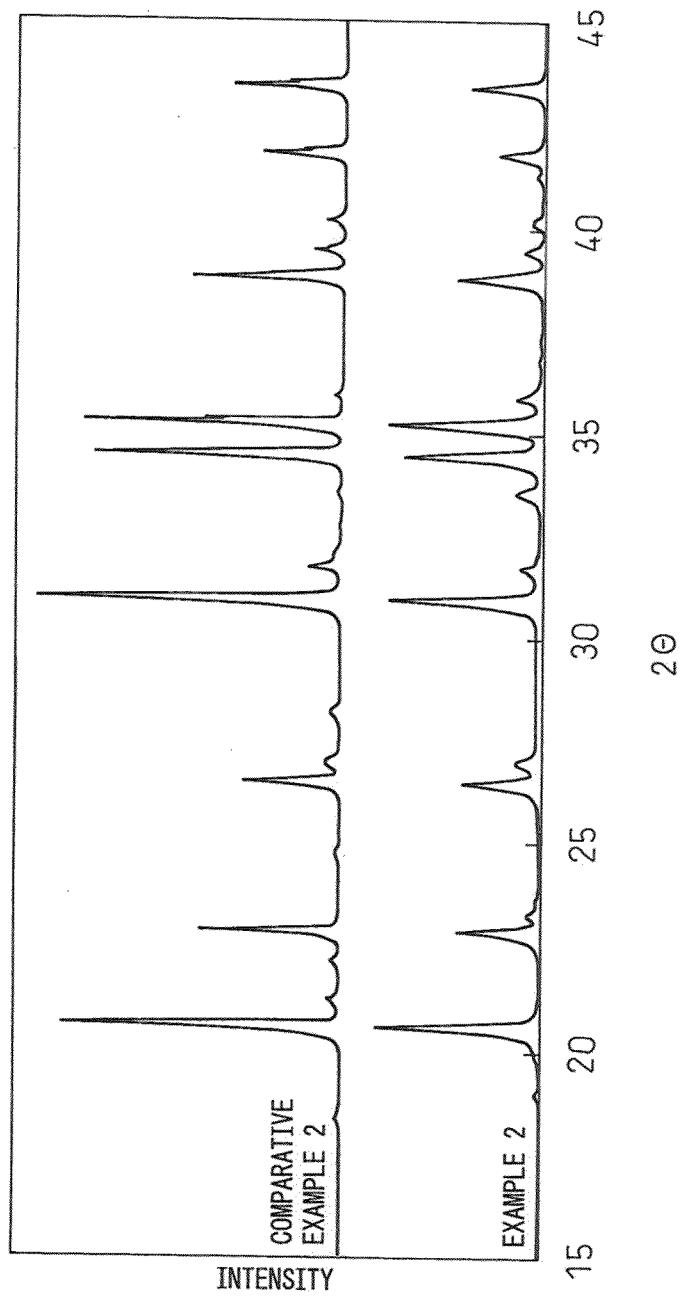

ns
α-TYPE SILICON NITRIDE PHOSPHOR AND PRODUCTION METHOD THEREOF

CROSS-REFERENCE TO RELATED APPLICATIONS

This application is based upon and claims the benefit of priority from Japanese Patent Application No. 2007-076250, filed on Mar. 23, 2007, the disclosure of which is incorporated herein by reference.

TECHNICAL FIELD

The present invention relates to an α-type silicon nitride phosphor composed of an α-type silicon nitride powder emitting fluorescence and a production method thereof.

BACKGROUND ART

A silicon nitride sintered body is an example of a ceramic for structural materials and is applied to a bearing, an automotive glow plug and the like. In recent years, other than a sintered body, for example, an α-type silicon nitride powder having a controlled particle morphology is applied to a filler and the like of various materials and it's becoming widely used. Also, a high-purity α-type silicon nitride powder is utilized as a raw material of an oxynitride or nitride phosphor. For example, in Japanese Unexamined Patent Publication (Kokai) No. 2002-363554, a yellow a sialon phosphor is disclosed. The a sialon is a phosphor larger in the amount of a red component than $Y_3Al_5O_{12}:Ce^{3+}$ (YAG) that is used as a yellow phosphor in conventional white light-emitting diodes and therefore, a warm white color can be obtained. For this reason, the above sialon phosphor is expected to become more widely used as a phosphor for future illumination.

DISCLOSURE OF THE INVENTION

As described above, a method for synthesizing a phosphor powder by using silicon nitride as a raw material is disclosed, but successful use of silicon nitride as a phosphor is not known. Silicon nitride is, as described above, utilized widely in various fields and when a fluorescent function is imparted thereto, various uses are expected to expand. For example, luminescence of silicon nitride that is used as a filler is considered to prompt new usage.

The present invention provides an α-type silicon nitride enabling new applications, that is, an α-type silicon nitride capable of emitting fluorescence. Heretofore, an α-type silicon nitride has not been utilized as a phosphor, because a luminous element in an amount of practical level cannot be incorporated into the α-type silicon nitride crystal. In the case of a sialon having an α-type silicon nitride-type crystal structure, a function as a phosphor is confirmed, but this function of such a crystal is achieved by replacing a part of silicon atoms in the α-type silicon nitride with another element, for example, aluminum, so as to enable introducing a luminous element into the crystal structure. In this way, in conventional techniques, an α-type silicon nitride does not exert a distinct fluorescent function. An object of the present invention is to provide a practical new phosphor material composed of an α-type silicon nitride.

The present inventors have found that when an α-type silicon nitride is produced using an α-type silicon nitride precursor having added thereto a luminous element for obtaining an α-type silicon nitride having a fluorescent function, an α-type silicon nitride that is originally incapable of becoming a phosphor can function as a phosphor. The present invention has been accomplished based on this finding.

That is, the present invention relates to an α-type silicon nitride phosphor containing a fluorescence-emittable element throughout an α-type silicon nitride particle from the surface to the inside. Preferably, the present invention relates to an α-type silicon nitride phosphor containing a fluorescence-emittable element throughout an α-type silicon nitride particle from the surface to the inside, wherein portions having a high emittable element concentration are present like islands.

Preferably, the present invention relates to the α-type silicon nitride phosphor above, wherein the fluorescence-emittable element is a lanthanide metal. More preferably, the present invention relates to the α-type silicon nitride phosphor above, wherein the lanthanide metal is at least one lanthanide metal selected from Ce, Eu, Tb, Dy and Yb.

Also, the present invention relates to a method for producing the α-type silicon nitride phosphor above, comprising adding a powder composed of a fluorescence-emittable element to silicon diimide $Si(NH)_2$ or an amorphous silicon nitride powder obtained by thermally decomposing silicon diimide $Si(NH)_2$, mixing the powders, and firing the mixture in a non-oxidizing atmosphere.

The present invention provides a practical new phosphor material composed of an α-type silicon nitride by using, as a raw material, silicon diimide $Si(NH)_2$ or an amorphous silicon nitride powder obtained by thermal decomposition of silicon diimide $Si(NH)_2$.

BRIEF DESCRIPTION OF THE DRAWINGS

FIG. 1 shows X-ray diffraction patterns of the silicon nitride powders obtained in Example 1 and Comparative Example 1.

FIG. 2A shows an electron micrograph of the α-type silicon nitride phosphor of the present invention obtained in Example 1, and FIG. 2B is an electron micrograph of the α-type silicon nitride phosphor of the present invention obtained in Comparative Example 1.

FIG. 4 shows X-ray diffraction patterns of the silicon nitride powders obtained in Example 2 and Comparative Example 2.

BEST MODE FOR CARRYING OUT THE INVENTION

The present invention is described in detail below.

The α-type silicon nitride phosphor having a fluorescent function of the present invention contains a fluorescence-emittable element throughout an α-type silicon nitride particle from the surface to the inside of the particle. Conventionally, a luminous element in an amount of practical level cannot be introduced into the α-type silicon nitride crystal and therefore, even if a particle containing a fluorescent element in the particle surface is present, the fluorescence-emittable element is not contained deeply in the inside of the particle. The α-type silicon nitride of the present invention contains a fluorescence-emittable element throughout a particle from the surface to the inside.

In one embodiment of the α-type silicon nitride phosphor of the present invention, as shown in the transmission analytical electron micrograph of FIG. 2A, portions having a high emittable element concentration (for example, numerals 1 to 3) are present like islands.

The fluorescence-emittable element is preferably a lanthanide metal, and the lanthanide metal is preferably at least one lanthanide metal selected from Ce, Eu, Tb, Dy and Yb. In FIG. 1, Example 1 is an X-ray diffraction pattern of one example of an α-type silicon nitride phosphor using Eu as the lanthanoid metal. This diffraction pattern reveals that the powder of the present invention is an α-type silicon nitride.

The oxygen content is preferably 2 wt % or more and 3 wt % or less. If the oxygen content is less than 2 wt %, the luminescence intensity is low, whereas if it exceeds 3 wt %, the luminescence intensity rather decreases.

Figure 3B:
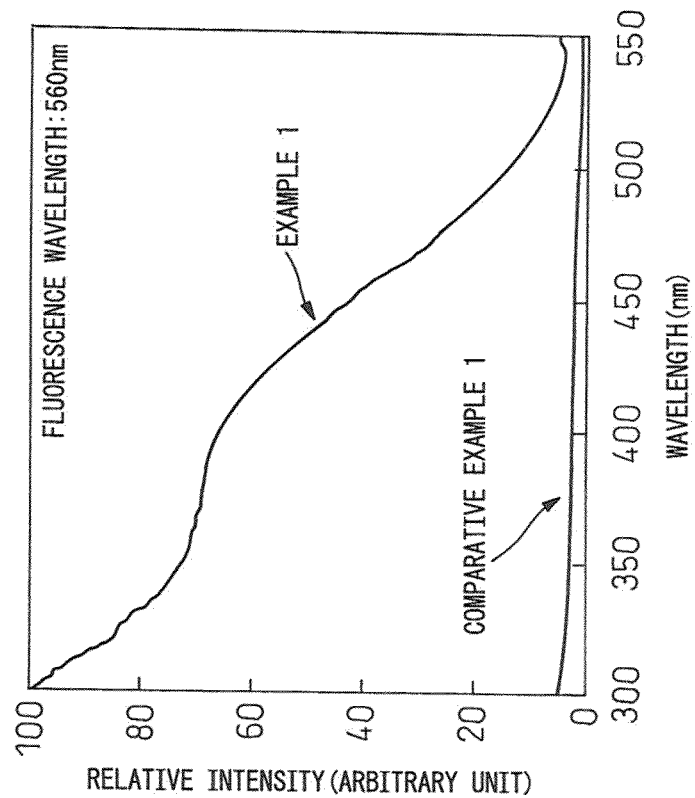
FIG. 3B shows excitation spectra of the silicon nitride powders obtained in Example 1 and Comparative Example 1.
Figure 3A:
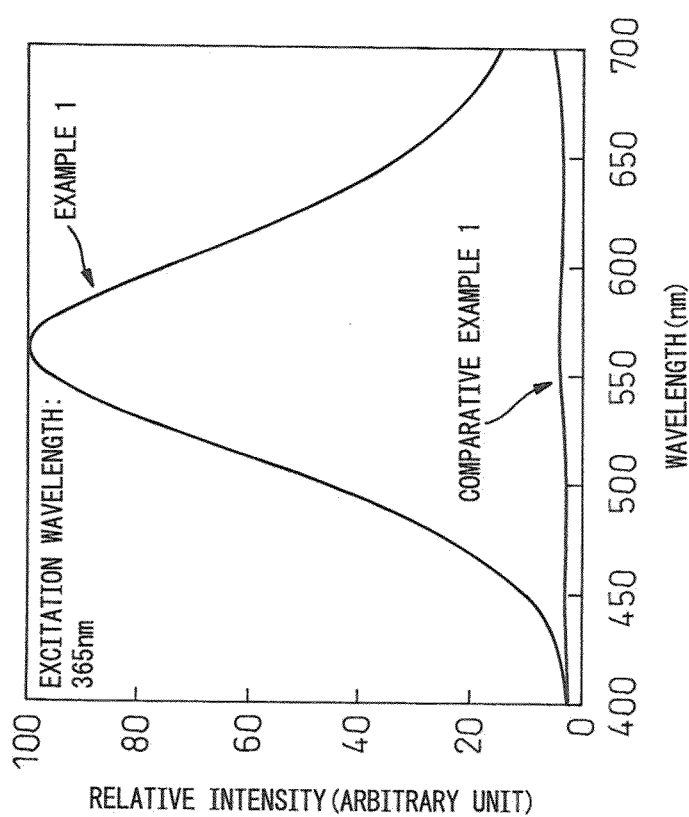
FIG. 3A shows fluorescent spectra of the silicon nitride powders obtained in Example 1 and Comparative Example 1.

The graph of Example 1 in FIG. 3A shows a fluorescence spectrum (excitation wavelength: 365 nm) of the powder above of the present invention. Strong fluorescence at a peak wavelength of 560 nm is observed and it is understood that the obtained α-type silicon nitride is a good phosphor. Also, the graph of Example 1 in FIG. 3B shows an excitation spectrum (fluorescence wavelength: 560 nm) of the powder above of the present invention. An excitation peak is observed in the vicinity of 300 nm and in the vicinity of 400 nm. The profile of this excitation spectrum is analogous to the peak profile of Eu-activated α-sialon and therefore, the fluorescence may be considered to be a luminescence from $Eu^{2+}$, but there is a difference from the excitation spectrum of sialon, and α-type silicon nitride and a sialon are considered to differ in the crystal field where $Eu^{2+}$ is placed.

The α-type silicon nitride phosphor of the present invention is produced utilizing a silicon nitride precursor. More specifically, a powder composed of a fluorescence-emittable element is added to and mixed with a silicon nitride precursor, and the mixture is fired in a non-oxidizing atmosphere, whereby the α-type silicon nitride phosphor of the present invention is obtained. The silicon nitride precursor includes silicon diimide ($Si(NH)_2$) and an amorphous silicon nitride powder obtained by thermally decomposing silicon diimide ($Si(NH)_2$). The powder composed of a fluorescence-emittable element, which is added to the raw material precursor of the α-type silicon nitride, includes a lanthanoid metal such as Ce, Eu, Tb, Dy and Yb. The non-oxidizing atmosphere may be, for example, a nitrogen atmosphere.

For the purpose of comparison with the present invention, various properties of a powder produced using a crystallized α-type silicon nitride as the raw material are described. The powder for comparison is a powder obtained by adding Eu as a luminous element to a crystallized α-type silicon nitride, mixing these, and firing the mixture in a nitrogen-containing non-oxidizing atmosphere. Comparative Example 1 of FIG. 1 is an X-ray pattern of the comparative powder obtained here. It is seen from the results of X-ray diffraction, that this comparative powder contains an α-type silicon nitride and slightly a β-silicon nitride. The main crystal phase is the same as that of the α-type silicon nitride of the present invention, but the fluorescent characteristics of them are greatly different with each other. The graph of Comparative Example 1 in FIG. 3A is a fluorescence spectrum of the comparative powder. The α-type silicon nitride of this comparative powder scarcely emits fluorescence. A peak of the spectrum is slightly observed at 560 nm, but this is considered to appear because Eu and a part of the silicon nitride powder are reacted and an emittable layer, for example, a glass layer, is produced in the powder surface. As another possibility, it may be considered that in a region very close to the surface, a luminous element is allowed to intrude into the α-type silicon nitride by a diffusion reaction and becomes luminous. In this case, only the particle surface becomes luminous and therefore, the luminescence intensity is very low. In the α-type silicon nitride containing a luminous element of the present invention, thanks to the production method in its own way, a luminous element is dispersed throughout the particle from the surface to the inside and therefore, strong luminescence can be obtained. Compared with Example 1, the fluorescence intensity of Comparative Example 1 is judged as substantially no luminescence.

From the analysis using an analytical transmission electron microscope, it is clear that in the case of the α-type silicon nitride of the present invention, Eu is present throughout the particle from the surface to the inside, whereas in the case of the powder produced using crystalline silicon nitride, Eu is scarcely present in the inside of the particle (see, FIG. 2). Also, in both cases, a glass layer is usually present on the particle surface and a glass layer containing a large amount of Eu exists.

As described above, when a silicon nitride precursor is used, a luminous element is dispersed throughout the particle from the surface to the inside and a crystalline α-type silicon nitride emitting sufficiently bright fluorescence can be obtained, whereas when a crystallized silicon nitride is used as the starting material, an α-type silicon nitride emitting fluorescence cannot be obtained. The reason therefor is because when a luminous element is present throughout an α-type silicon nitride precursor, an α-type silicon nitride is formed while taking in the luminous element when the precursor is crystallized, whereas when an α-type silicon nitride raw material is used, the luminous element cannot intrude into the crystal and an α-type silicon nitride containing no luminous element is formed. Conventionally, a rare earth element such as Eu has been considered not to intrude into an α-type silicon nitride, but the crystal structure of the α-type silicon nitride has a site allowing easy intrusion of a large ion and therefore, it is presumed that if such an ion is present in the course of the precursor being crystallized, the ion can be taken in. The charge neutrality is considered to be compensated for by a defect or by oxygen substitution at a nitrogen site.

The silicon nitride precursor for use in the present invention is obtained, for example, by reacting silicon tetrachloride and ammonia. In this case, silicon diimide is obtained. Also, the imide may be thermally decomposed and used as a silicon nitride in an amorphous state. Furthermore, a mixture of silicon diimide and amorphous silicon nitride may also be used. The mixing ratio between the silicon diimide and the amorphous silicon nitride can be freely changed by the thermal decomposition temperature when producing the amorphous silicon nitride by heating the silicon diimide. In a usual X-ray diffraction method, the amorphous silicon nitride powder does not exhibit a distinct diffraction peak and is in a so-called amorphous state. Depending on the heat treatment conditions, a powder exhibiting a weak X-ray diffraction peak may be obtained, but such a powder is also included in the amorphous silicon nitride powder as referred to in the present invention. In the production method of the present invention, the amorphous silicon nitride powder may contain a nitrogen-containing silane compound having an oxygen content adjusted to 1 to 5 mass %.

The fluorescence-emittable element may be any known luminous element, but a rare earth element can emit strong fluorescence and is preferred. Above all, divalent Eu and trivalent Ce are suitable because luminescence is obtained by the d-f transition and in turn, strong fluorescence is obtained. The element can be added in the form of, for example, an oxide, carbonate, nitride, chloride or nitrate containing such an element. The amount added may be, in terms of the metal component, from 0.01 to 0.6 mol, preferably from 0.05 to 0.2, per mol of the silicon nitride. If the amount of the luminous element is small, the luminescence intensity becomes low and the phosphor is not practical. Even if it is excessively large, the luminescence intensity also decreases.

The method for mixing the silicon nitride precursor and the luminous element is not particularly limited, and a known method, for example, a method of dry mixing these, or a method of wet mixing these in an inert solvent that does not substantially react with respective components of the raw material and then removing the solvent, may be employed. Examples of the mixing device that is suitably used include a V-type mixer, a rocking mixer, a ball mill, a vibration mill and a medium stirring mill. However, the nitrogen-containing silane compound and/or the amorphous silicon nitride powder are very sensitive to water and moisture and therefore, the mixing of starting materials needs to be performed in a controlled inert gas atmosphere.

The mixture of the starting materials is fired at 1,300 to 1,800° C., preferably from 1,400 to 1,650° C., under 1 atm in a nitrogen-containing inert gas atmosphere, whereby the objective α-type silicon nitride powder is obtained. If the firing temperature is less than 1,300° C., production of the desired α-type silicon nitride powder requires heating for a long time and this is not practical, whereas if the firing temperature exceeds 1,800° C., the silicon nitride sublimates and decomposes and free silicon is disadvantageously produced.

The starting material mixed powder may also be fired in a temperature range from 1,600 to 2000° C., preferably from 1,600 to 1,900° C., in a pressurized nitrogen gas atmosphere. In this case, the pressurized nitrogen gas prevents sublimation and decomposition of silicon nitride at a high temperature, and a desired α-type silicon nitride phosphor can be obtained in a short time. The firing temperature can be elevated by increasing the nitrogen gas pressure, but the mixed powder can be fired, for example, at 1,600 to 1,850° C. under a nitrogen gas pressure of 5 atm and at 1,600 to 2,000° C. under a nitrogen gas pressure of 10 atm.

The heating furnace used for the firing of the powder mixture is not particularly limited and for example, a batch electric furnace using a high frequency induction heating system or resistance heating system, a rotary kiln, a fluidized firing furnace or a pusher type electric furnace can be used. Examples of the crucible which can be used include a carbon-made crucible, BN and a silicon nitride crucible.

According to the present invention, silicon diimide ($Si(NH)_2$) or an amorphous silicon nitride powder obtained by thermally decomposing silicon diimide ($Si(NH)_2$) is used as the raw material, so that a practical new phosphor material composed of an α-type silicon nitride powder can be provided.

EXAMPLES

Example 1

An amorphous silicon nitride powder obtained by thermally decomposing silicon diimide obtained through a reaction of silicon tetrachloride with ammonia and an europium oxide powder were weighed to give a composition shown in Table 1. The weighed powders were mixed by a vibration mill for 1 hour in a nitrogen atmosphere. The mixed powder was filled in a BN-made crucible, and the crucible was set in a high frequency heating furnace and heated in a nitrogen gas atmosphere by a temperature rise schedule of from room temperature to 1,200° C. for 1 hour, from 1,200 to 1,400° C. for 4 hours and from 1,400 to 1,600° C. for 2 hours to obtain an Eu-containing α-type silicon nitride powder. This powder was examined for the crystal phase by using an X-ray diffraction apparatus. FIG. 1 shows the results. The powder was confirmed to be an α-type silicon nitride.

Also, for clarifying the morphology of Eu present in this α-type silicon nitride, observation of the particle morphology and quantitative analysis of Eu in the inside of the crystal particle were performed using a transmission analytical electron microscope (JEM-2010F, manufactured by JEOL Ltd., EDS: a UTW-type Si semiconductor detector manufactured by NORN, beam diameter: 1 nm).

In order to observe the inside of the particle by eliminating the effect of the surface, the particle was buried in a resin and then subjected to cutting, polishing and ion milling to produce a thin cross-sectional sample of the particle. In the composition analysis, since nitrogen is a light element and is difficult to measure, the atom ratio of Si and Eu was measured, and the measurement results were adjusted by the percentage of the ratio Eu/(Si+Eu). FIG. 2A shows the electron micrograph. Spotted portions were present in the inside of the particle and therefore, the composition analysis of this portion was also performed. Furthermore, adhesion of a glass phase was observed on the particle surface, and this portion was also analyzed. The results are shown in Table 2. The spotted portions were a portion where the abundance of Eu was particularly large. A large amount of Eu was present also in portions other than the spotted portions. Compared with the α-type silicon nitride of Comparative Example 1 later where Eu was scarcely present in the inside of the particle, it is clear that Eu is distinctly present in the inside of this α-type silicon nitride particle. Also, the crystal structure was examined by performing electron microbeam diffraction in the spotted portions and on the inside of the particle other than the spotted portions, as a result, a diffraction pattern of α-type silicon nitride was exhibited. From this, introduction of Eu into the α-type silicon nitride crystal was confirmed. The amount of Eu in the glass phase portion was larger than in the inside of the particle, revealing that Eu failing in existing as a solid solution in the inside of the particle is present as a glass phase in the particle surface. Incidentally, the oxygen content of this powder was measured by an oxygen-nitrogen simultaneous analyzer TC-136 manufactured by LECO and found to be 2.5 wt %.

Subsequently, the fluorescence spectrum was evaluated by a fluorescence measuring device by setting the excitation wavelength to 365 nm. FIG. 3A shows the results. An emission peak by fluorescence was observed in the vicinity of 560 nm. Also, FIG. 3B shows the excitation spectrum when the fluorescence wavelength was set to 560 nm. A peak pattern considered to be that of luminescence by $Eu^{2+}$ was observed. The reason why such conspicuous fluorescence is observed is because Eu emitting fluorescence is present in the inside of the particle and a crystallographic site allowing luminescence of Eu is present.

TABLE 1

|  | Morphology of Silicon Nitride | Element Doped | Addition Molar Number per Mol of Silicon Nitride (in terms of metal) |
|---|---|---|---|
| Example 1 | amorphous | Eu | 0.03 |
| Comparative Example 1 | crystalline | Eu | 0.03 |
| Example 2 | amorphous | Ce | 0.03 |
| Comparative Example 2 | crystalline | Ce | 0.03 |
| Example 3 | amorphous | Eu | 0.01 |
| Example 4 | amorphous | Eu | 0.06 |
| Example 5 | amorphous | Eu | 0.10 |
| Example 6 | amorphous | Eu | 0.15 |
| Example 7 | amorphous | Eu | 0.30 |
| Example 8 | amorphous | Eu | 0.60 |
| Example 9 | amorphous | Ce | 0.01 |
| Example 10 | amorphous | Ce | 0.06 |
| Example 11 | amorphous | Ce | 0.10 |
| Example 12 | amorphous | Ce | 0.15 |
| Example 13 | amorphous | Ce | 0.30 |
| Example 14 | amorphous | Yb | 0.03 |
| Comparative Example 3 | crystalline | Yb | 0.03 |
| Example 15 | amorphous | Tb | 0.03 |
| Comparative Example 4 | crystalline | Tb | 0.03 |
| Example 16 | amorphous | Dy | 0.03 |
| Comparative Example 5 | crystalline | Dy | 0.03 |
| Example 17 | silicon diimide | Eu | 0.03 |

TABLE 2

|  | Eu/(Si + Eu) Ratio in the Inside of Particle | Eu/(Si + Eu) Ratio in Spotted Portion | Eu/(Si + Eu) Ratio in Surface Glass Phase |
|---|---|---|---|
| Example 1 | 1.04 | 3.38 | 17.69 |
| Comparative Example 1 | 0.02 | — | 14.79 |

Comparative Example 1

A powder was produced by the same method as in Example 1 except that crystalline silicon nitride having a specific surface area of about 10 m²/g was used in place of the amorphous silicon nitride used in Example 1. The obtained powder was examined for the crystal structure by an X-ray diffraction apparatus in the same manner as in Example 1. FIG. 1 shows the results. A weak peak of β-type silicon nitride was observed in the vicinities of 27.0 and 33.7, but other peaks all were the peak of α-type silicon nitride and this powder was composed almost of α-type silicon nitride.

Furthermore, a cross-sectional sample of the powder was produced in the same manner as in Example 1, and the abundance of Eu in the inside of the particle was examined using a transmission electron microscope. FIG. 2B shows the morphology of the particle. Unlike Example 1, the inside of the particle was uniform. As a result of analysis, compared with Example 1, Eu was scarcely present in the inside of the particle. On the other hand, Eu was present in a large amount in the glass phase adhering to the surface, and this α-type silicon nitride of Comparative Example 1 was characterized in that Eu is not introduced into the inside of the particle and is present only in the surface glass phase. The oxygen content of this powder was measured in the same manner as in Example 1 and found to be 1.6 wt %.

Subsequently, the fluorescence spectrum was measured by the same method as in Example 1. FIG. 3A shows the results. A peak was slightly observed in the vicinity of 560 nm but is very low compared with the luminescence intensity of Example 1, revealing that when crystalline silicon nitride is used, the powder does not become a good phosphor. This weak fluorescence is highly likely to be luminescence of Eu because Eu is present also in the glass phase. However, because of luminescence of Eu in the glass phase, the luminescence intensity must be low. As another possibility, it may be considered that in an extreme surface, Eu is allowed to intrude into the inside of α-type silicon nitride by a diffusion reaction. In this case, there is a possibility that an emittable α-type silicon nitride layer is produced in the surface. However, this layer is produced only in the surface and therefore, the luminescence intensity is low. As described above, the emittable α-type silicon nitride of the present invention is characterized in that a luminous element is present throughout the particle from the surface to the inside, and is essentially different from a particle where a part such as surface emits luminescence. As shown in FIG. 3B, the excitation spectrum differs from the peak profile of Example 1, and the luminescence cannot be identified as the luminescence of $Eu^{2+}$.

Example 2

Figure 5:
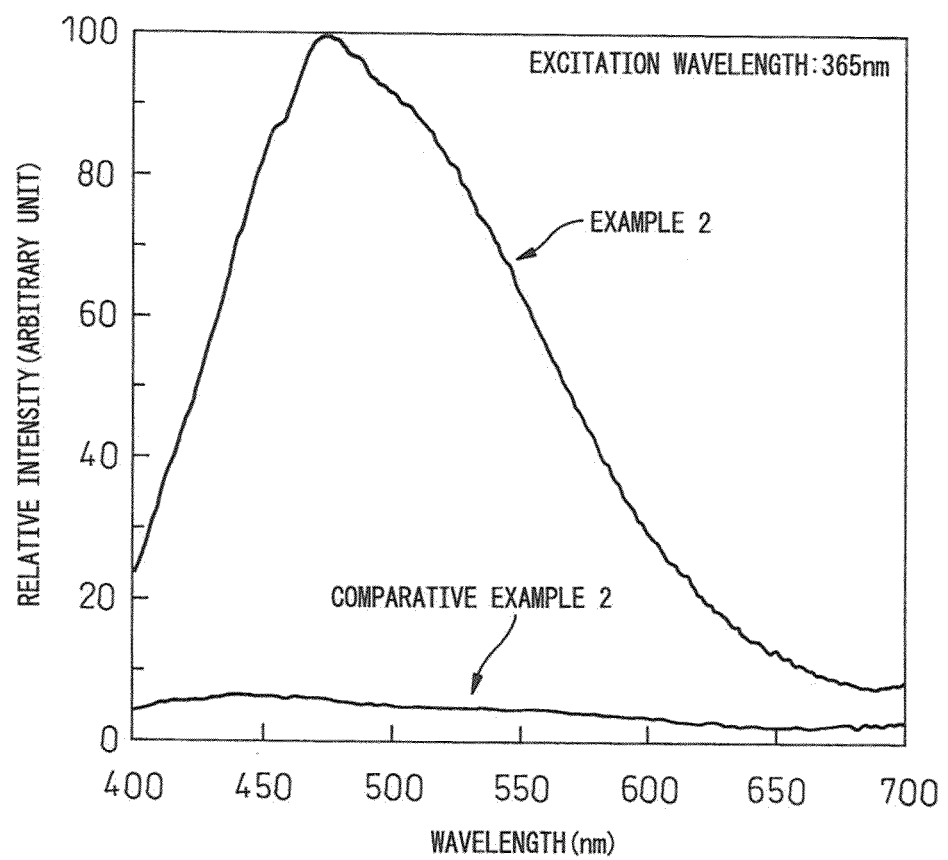
FIG. 5 shows fluorescent spectra of the silicon nitride powders obtained in Example 2 and Comparative Example 2.

A powder was produced by the same method as in Example 1 except that cerium oxide was weighed in place of the europium oxide of Example 1 to give the composition of Table 1. The crystal phase was confirmed by X-ray and the fluorescence spectrum and excitation spectrum were measured. FIG. 4 shows the X-ray diffraction pattern. The crystal phase slightly contains β-type silicon nitride but is composed almost of α-type silicon nitride, and the diffraction pattern was the same as Comparative Example 1. FIG. 5 shows the fluorescence spectrum of this powder when the excitation wavelength was set to 365 nm. Clear fluorescence having a peak at about 475 nm was observed.

Comparative Example 2

A powder was produced by the same method as in Example 2 except that crystalline silicon nitride used in Comparative Example 1 was used in place of the amorphous silicon nitride used in Example 2, and the X-ray diffraction and fluorescence spectrum were measured in the same manner as in Example 2. FIG. 4 shows the X-ray diffraction pattern. The crystal phase slightly contains β-type silicon nitride but is composed almost of α-type silicon nitride. FIG. 5 shows the fluorescence spectrum of this powder. The excitation wavelength was set to 365 nm. As a result of the measurement, fluorescence was scarcely observed. In this way, when crystalline silicon nitride is used, a powder emitting good fluorescence cannot be produced.

Examples 3 to 8

Figure 6:
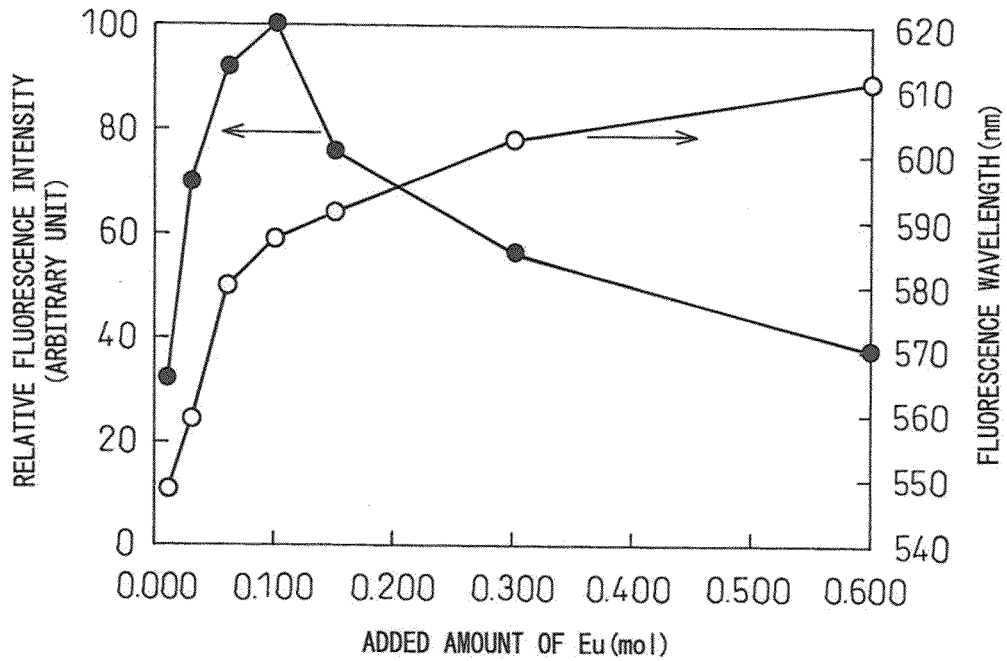
FIG. 6 shows fluorescent characteristics of the Eu-doped α-type silicon nitride phosphor obtained in Examples 3 to 8.

The fluorescence spectrum was examined by varying the added amount of Eu in Example 1 in a ratio shown in Table 1. FIG. 6 shows the fluorescence intensity at an excitation wavelength of 365 nm and the wavelength thereof, including Example 1. A maximum fluorescence intensity is exhibited when the added amount of Eu is 0.1 mol, and the fluorescence intensity is decreased in other added amounts. In a phosphor powder, concentration quenching takes place when the amount of the activating element is increased, and the same occurs in the powder of the present invention. This is considered to prove that Eu is present in the inside of the α-type silicon nitride. Also, the wavelength was shifted to the long wavelength side along with an increase in the added amount of Eu and was changed from 550 nm to 610 nm. Such a change of the fluorescence wavelength is observed also in other Eu-containing phosphors, and Eu is considered to exist as a solid solution in the inside of α-type silicon nitride. Incidentally, the oxygen contents of the powder of Example 3 and the powders of Examples 5 and 8 were measured in the same manner as in Example 1 and found to be 1.6 wt %, 2.9 wt % and 7.3 wt %, respectively.

Examples 9 to 13

Figure 7:
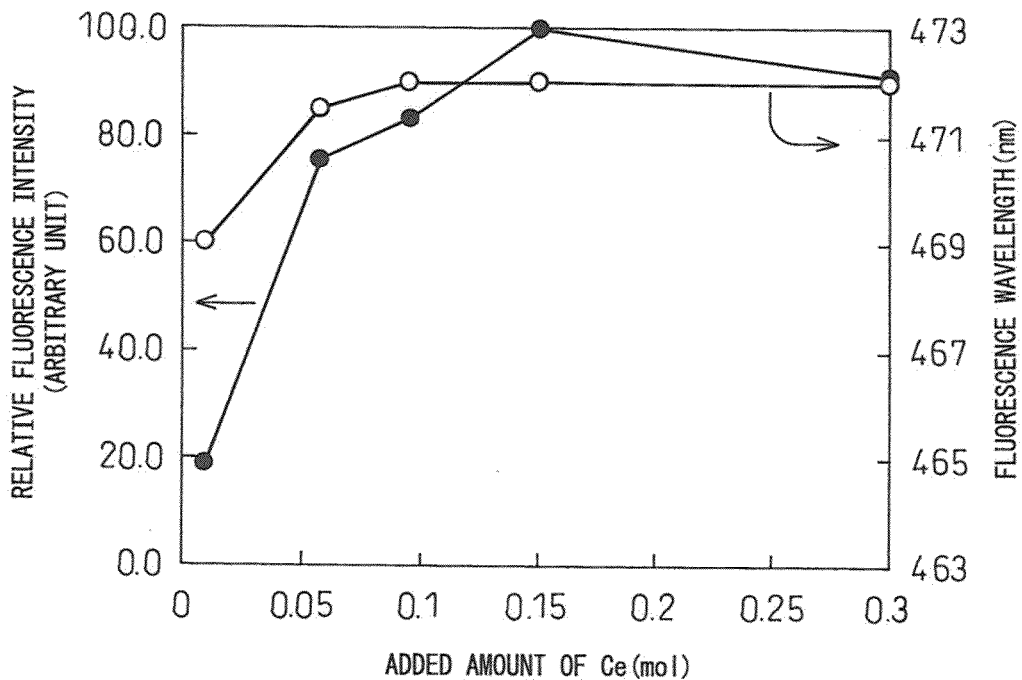
FIG. 7 shows fluorescent characteristics of the Ce-doped α-type silicon nitride phosphor obtained in Examples 9 to 13.

A powder was produced by the same method as in Example 3 except that Eu in Example 3 was changed to Ce. The added amount of Ce is shown in Table 1. FIG. 7 shows the added amount of Ce and the fluorescence intensity when the excitation wavelength was set to 365 nm. The fluorescence intensity was maximum at a Ce concentration of 0.15 mol and was decreased when the added amount became larger than that.

Example 14

Figure 8:
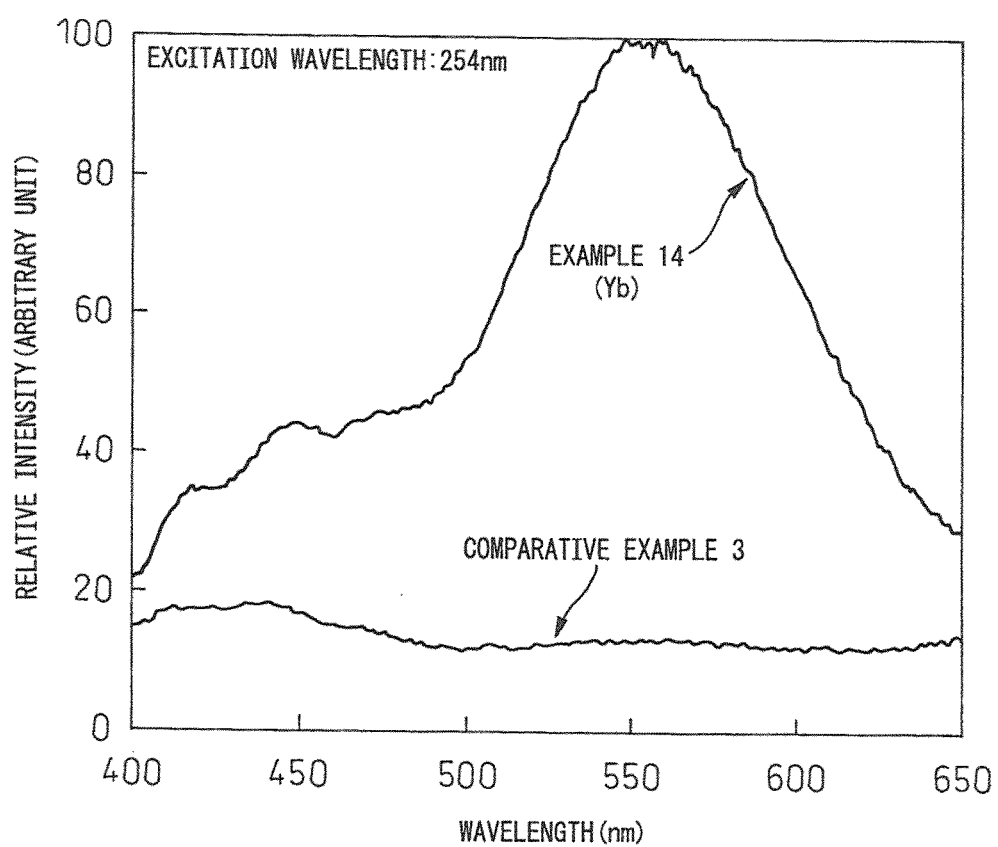
FIG. 8 shows fluorescent spectra of the silicon nitride powders obtained in Examples 14 and Comparative Example 3.

A powder was produced by the same method as in Example 1 except that ytterbium (Yb) oxide was weighed in place of the europium oxide of Example 1 to give the composition of Table 1, and confirmation of the crystal phase by X-ray and measurements of the fluorescence spectrum and excitation spectrum were performed. As a result of X-ray measurement, the phases were mostly composed of α-type silicon nitride. FIG. 8 shows the fluorescence spectrum of this powder when the excitation wavelength was set to 254 nm. Clear fluorescence having a peak at about 555 nm was observed.

Comparative Example 3

A powder was produced by the same method as in Example 14 except that crystalline silicon nitride used in Comparative Example 1 was used in place of the amorphous silicon nitride used in Example 14, and the X-ray diffraction and fluorescence spectrum were measured in the same manner as in Example 14. The crystal phase was composed mostly of α-type silicon nitride. FIG. 8 shows the fluorescence spectrum of this powder. The excitation wavelength was set to 254 nm. As a result of the measurement, fluorescence was scarcely observed.

Example 15

Figure 9:
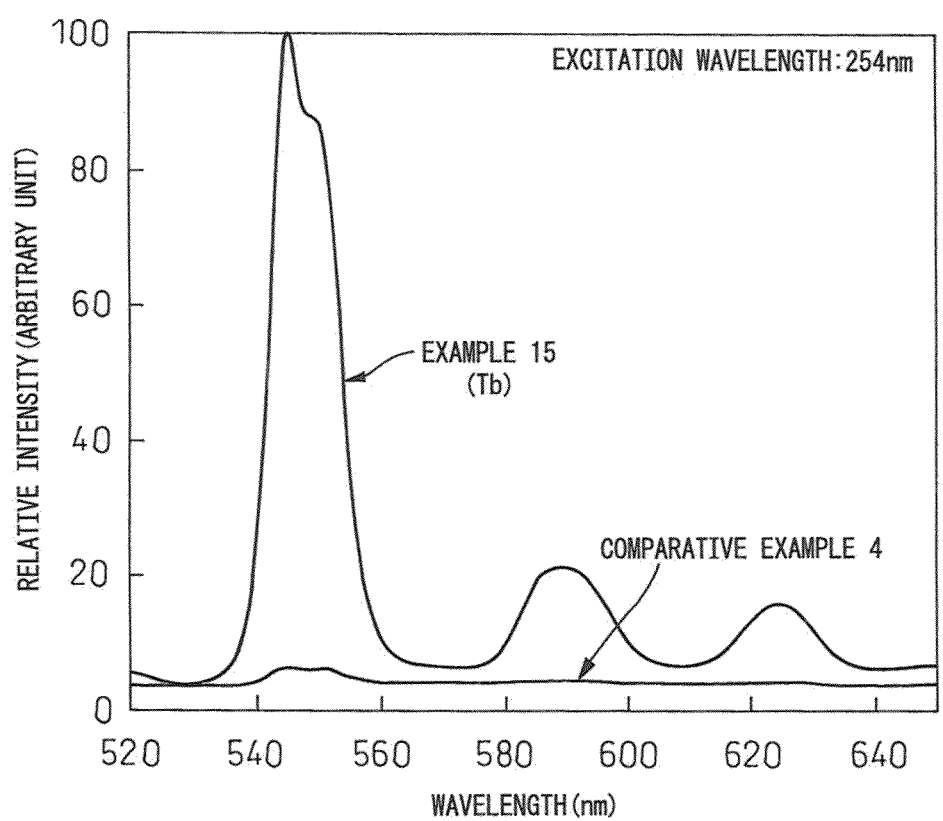
FIG. 9 shows fluorescent spectra of the silicon nitride powders obtained in Examples 15 and Comparative Example 4.

A powder was produced by the same method as in Example 1 except that terbium (Tb) oxide was weighed in place of the europium oxide of Example 1 to give the composition of Table 1, and confirmation of the crystal phase by X-ray and measurements of the fluorescence spectrum and excitation spectrum were performed. As a result of X-ray measurement, the phases were mostly composed of α-type silicon nitride. FIG. 9 shows the fluorescence spectrum of this powder when the excitation wavelength was set to 254 nm. Clear fluorescence having a peak at about 545, 590 and 635 nm was observed.

Comparative Example 4

A powder was produced by the same method as in Example 15 except that crystalline silicon nitride used in Comparative Example 1 was used in place of the amorphous silicon nitride used in Example 15, and the X-ray diffraction and fluorescence spectrum were measured in the same manner as in Example 15. The crystal phase was composed mostly of α-type silicon nitride. FIG. 9 shows the fluorescence spectrum of this powder. The excitation wavelength was set to 254 nm. As a result of the measurement, fluorescence was scarcely observed.

Example 16

Figure 10:
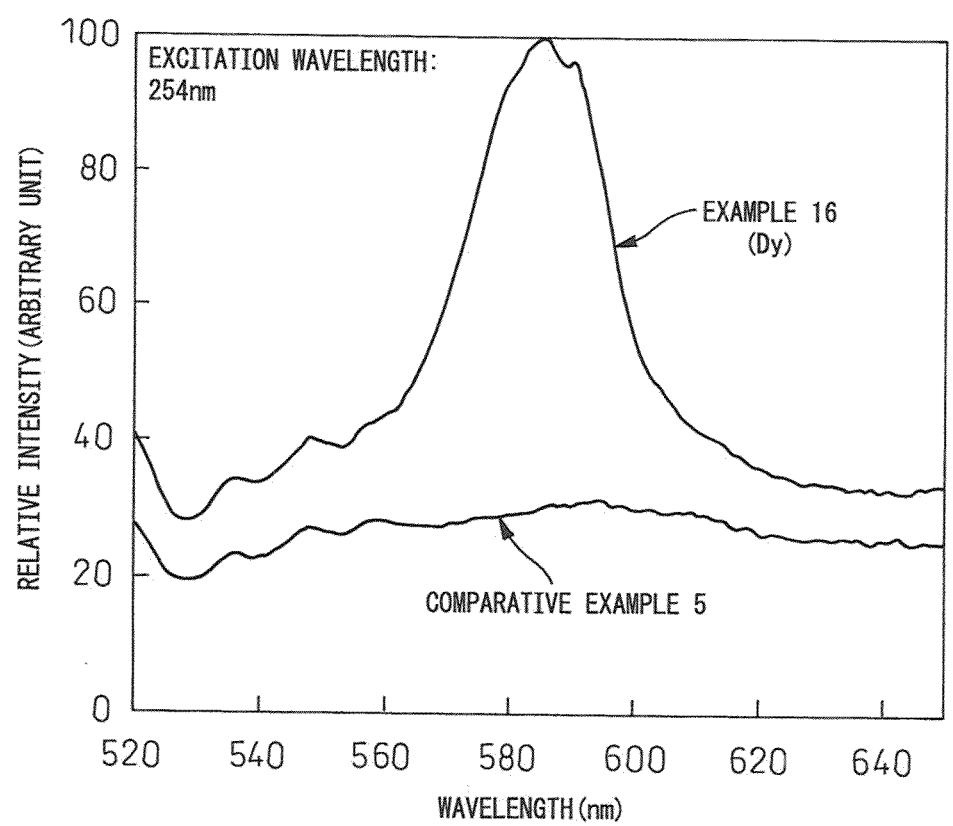
FIG. 10 shows fluorescent spectra of the silicon nitride powders obtained in Examples 16 and Comparative Example 5.

A powder was produced by the same method as in Example 1 except that dysprosium (Dy) oxide was weighed in place of the europium oxide of Example 1 to give the composition of Table 1, and confirmation of the crystal phase by X-ray and measurements of the fluorescence spectrum and excitation spectrum were performed. As a result of X-ray measurement, the phases were mostly composed of α-type silicon nitride. FIG. 10 shows the fluorescence spectrum of this powder when the excitation wavelength was set to 254 nm. Clear fluorescence having a peak at about 584 nm was observed.

Comparative Example 5

A powder was produced by the same method as in Example 16, except that crystalline silicon nitride used in Comparative Example 1 was used in place of the amorphous silicon nitride used in Example 16, and the X-ray diffraction and fluorescence spectrum were measured in the same manner as in Example 16. The crystal phase was composed mostly of α-type silicon nitride. FIG. 10 shows the fluorescence spectrum of this powder. The excitation wavelength was set to 254 nm. As a result of the measurement, fluorescence was scarcely observed.

Example 17

A powder was produced by the same method as in Example 1, except that silicon diimide produced by the reaction of silicon tetrachloride with ammonia was used in place of the amorphous silicon nitride of Example 1 and weighed to give the composition of Table 1, and confirmation of the crystal phase by X-ray was performed. As a result, the phases were mostly composed of α-type silicon nitride. When the fluorescence spectrum of this powder was measured by setting the excitation wavelength to 365 nm, strong fluorescence similar to Example 1 was observed.

INDUSTRIAL APPLICABILITY

According to the present invention, a practical new phosphor material composed of an α-type silicon nitride is provided. Silicon nitride is utilized widely in various fields and when a fluorescent function is imparted thereto, various uses are expected to expand. For example, luminescence of silicon nitride that is used as a filler is considered to prompt new usage. The industrial applicability of the phosphor material composed of an α-type silicon nitride powder of the present invention is evident.

The invention claimed is:

1. An α-$Si_3N_4$ phosphor containing a fluorescence-emittable element throughout an α-$Si_3N_4$ particle from a surface thereof to an inside portion thereof, wherein island portions having a high emittable element concentration are surrounded by a sea portion having a lower emittable element concentration.

2. The α-$Si_3N_4$ phosphor as claimed in claim 1, wherein said fluorescence-emittable element is a lanthanide metal.

3. The α-$Si_3N_4$ phosphor as claimed in claim 2, wherein said lanthanide metal is at least one lanthanide metal selected from the group consisting of Ce, Eu, Tb, Dy and Yb.

4. The α-$Si_3N_4$ phosphor as claimed in claim 1, wherein the phosphor further contains oxygen in an amount of 2 to 3 wt %.

* * * * *